US009964643B2

(12) United States Patent
Maeda

(10) Patent No.: US 9,964,643 B2
(45) Date of Patent: May 8, 2018

(54) VEHICLE OCCUPANCY DETECTION USING TIME-OF-FLIGHT SENSOR

(75) Inventor: Patrick Yasuo Maeda, Mountain View, CA (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 275 days.

(21) Appl. No.: 13/315,016

(22) Filed: Dec. 8, 2011

(65) Prior Publication Data

US 2013/0148845 A1    Jun. 13, 2013

(51) Int. Cl.
*G01S 17/02* (2006.01)
*G01S 17/89* (2006.01)
*G08G 1/04* (2006.01)

(52) U.S. Cl.
CPC ............ *G01S 17/023* (2013.01); *G01S 17/89* (2013.01); *G08G 1/04* (2013.01)

(58) Field of Classification Search
CPC .............................. G01S 17/023; G01S 17/89
See application file for complete search history.

(56) References Cited

U.S. PATENT DOCUMENTS

| 4,846,571 | A | 7/1989 | Jelalian et al. |
| 2003/0169906 | A1 | 9/2003 | Gokturk et al. |
| 2004/0037450 | A1 | 2/2004 | Bradski |
| 2005/0078297 | A1 | 4/2005 | Doemens et al. |
| 2008/0048887 | A1* | 2/2008 | Aoki et al. .................... 340/937 |
| 2008/0143085 | A1 | 6/2008 | Breed et al. |
| 2008/0175438 | A1 | 7/2008 | Alves |
| 2009/0309974 | A1 | 12/2009 | Agrawal et al. |
| 2010/0034427 | A1 | 2/2010 | Fujimura et al. |
| 2011/0158481 | A1 | 6/2011 | Chang |

FOREIGN PATENT DOCUMENTS

GB        2251150        6/1992

OTHER PUBLICATIONS

Wood, Jack W., Gary G. Gimmestad, and David W. Roberts. "Covert camera for screening of vehicle interiors and HOV enforcement." AeroSense 2003. International Society for Optics and Photonics, 2003.*
Meers, Simon, and Koren Ward. "Face recognition using a time-of-flight camera." Computer Graphics, Imaging and Visualization, 2009. CGIV'09. Sixth International Conference on. IEEE, 2009.*
Autofocus, Wikipedia: the free encyclopedia, Dec. 2, 2010.*
Pavlidis et al., "A Vehicle Occupant Counting System Based on Near-Infrared Phenomenology and Fuzzy Neural Classification", IEEE Transactions on Intelligent Transportation Systems, vol. 1, No. 2, Jun. 2000, pp. 72-85.
European Search Report dated Mar. 15, 2013 for European Application No. 12195379.8, 6 pages.
European Search Report dated Feb. 13, 2017 for European Application No. 12195379.8, 5 pages.

* cited by examiner

*Primary Examiner* — Stephen R Koziol
*Assistant Examiner* — Raphael Schwartz
(74) *Attorney, Agent, or Firm* — Hollingsworth Davis, LLC

(57) ABSTRACT

Vehicle occupancy detection involves projecting modulated light onto an occupant from a light source outside of a vehicle. Reflections of the light source are received at a detector located outside of the vehicle. Three-dimensional data is determined based on a time-of-flight of the reflections, and the occupant is detected based on the three-dimensional data.

19 Claims, 4 Drawing Sheets

VEHICLE OCCUPANCY DETECTION USING TIME-OF-FLIGHT SENSOR

SUMMARY

Various embodiments described herein are generally directed to methods, systems, and apparatuses that facilitate detecting occupants of a vehicle. In one embodiment, a method involves projecting modulated light onto an occupant from a light source outside of a vehicle. Reflections of the light source are received at a detector located outside of the vehicle. A three-dimensional model is determined based on a time-of-flight of the reflections, and the occupant is detected based on the three-dimensional model.

In another embodiment, an apparatus includes a light source configured to project modulated light onto an occupant from outside of a vehicle. The apparatus also includes a detector configured to receive reflections of the light, and a processor coupled to the light source and the detector. The processor is configured to determine time-of-flight of the reflections, determine a three-dimensional model of an interior of the vehicle based on the time-of-flight of the reflections; and detect the occupant based on the three-dimensional model.

In another embodiment, a system includes a time-of-flight sensor configured to detect objects in an interior of a vehicle from outside of the vehicle. A computing arrangement is coupled to the time-of-flight sensor, and has a processor configured to receive data from the time-of-flight sensor, detect an occupant of the vehicle based on the data, and signal the detection of the occupant to an end-user application.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
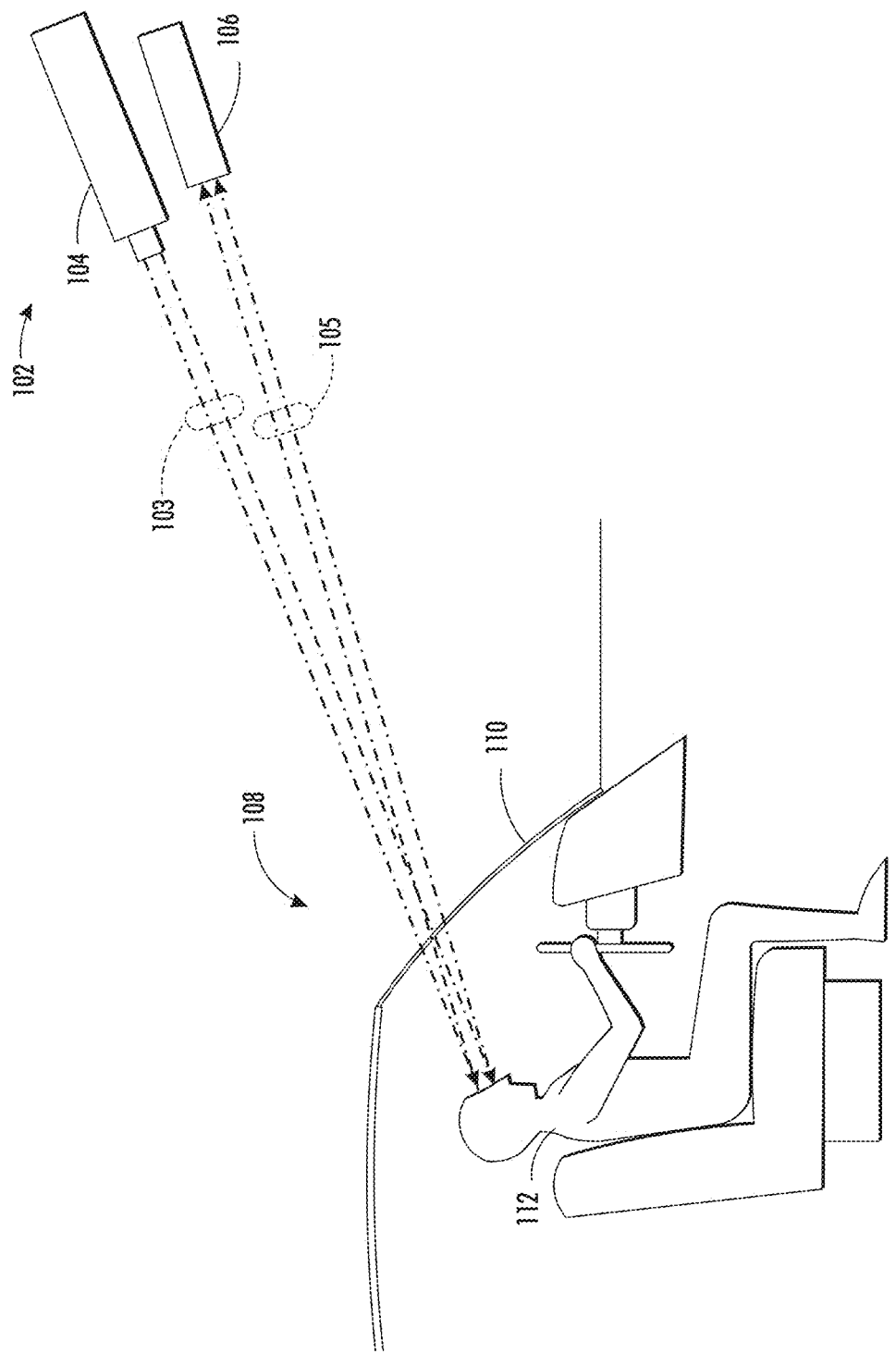
FIG. 1 is a block diagram of a sensing arrangement according to an example embodiment.

The present disclosure relates generally to automated system for identifying people and their surroundings. For example, methods, systems and apparatuses are described below that can externally detect objects inside a vehicle in a changing outdoor environment. For example, a system may be used to detect occupants in a stationary or moving vehicle. One approach to accomplish this involves generating three-dimensional data (e.g., a depth map or 3D point cloud) for identifying vehicle occupants using a time-of-flight depth sensor and modulated light emitting diode (LED) or laser light source. The depth sensor may include an imaging camera lens and a complementary metal-oxide semiconductor (CMOS) sensor array like the CamCube 3.0 ToF (Time-of-Flight) Camera from PMD Technologies GmbH of Siegen, Germany. The CMOS array is structured and driven to detect a time it takes light emitted from the light source to travel to an object, and arrive back at the CMOS array due to being reflected off the object. Measurements of time of flight over a given spatial region can be used to generate a three-dimensional depth map of the object within the spatial region.

Due to the modulated nature of the illumination by provided by the LED or laser in the proposed embodiments, the light used to determine the time of flight can be discriminated from ambient or background light. This makes the system less sensitive to variations in lighting conditions, shading, obscurations, surface textures and colors, unwanted specular reflections, etc., that may reduce the effectiveness of two-dimensional intensity images. In applications such as vehicle occupant detection, these variations in lighting conditions and the like may be particularly prevalent, e.g., due to the occupant being located within an enclosed space behind a windshield. Thus, while a time-of-flight arrangement as described herein may be useful for identifying a variety of vehicle features, it may be particularly useful in occupant detection systems.

A time-of-flight arrangement may be useful for detecting occupants in a vehicle, despite optical problems caused by varying illumination, reflection, window material, etc. The vehicle and its major components may be located and identified well enough (e.g., using conventional intensity imaging) to permit the time-of-flight sensing mechanism to be aimed and focused optimally to detect occupants within the vehicle. This arrangement may be implemented at an acceptable cost to organizations that require these capabilities, such as public transportation departments, police departments, etc. The embodiments may be applicable to similar applications involving identifying objects behind obstructions such as partially-open blinds, foliage, window screens, high-contrast lighting conditions, etc. As a result, it will be appreciated that the embodiments need not be limited only to vehicle occupancy detection. These embodiments may be applicable to any application where object identification is desired and where two-dimensional imagery is degraded due to optical interference and variations noted above.

In reference now to FIG. 1, a block diagram illustrates an example embodiment of the invention. A sensing arrangement 102 may include at least a light source 104 and a detector 106. The light source 104 (e.g., laser or LED) emits light (represented here by emitted rays/waveforms 103) which reflect off of objects. For example, the light source 104 may provide incoherent, near-infrared, amplitude modulated, continuous waveform (CW) light. The reflected light (represented here as rays/waveforms 105) may distinguished from one another by the time it takes for the light to return to the detector 106, e.g., time-of-flight (ToF). This time difference may be measured, for example, by a phase difference between respective return waveforms 105. Alternatively, the outgoing light 103 may be encoded, e.g., with a numerical count, and this data may be decoded in the returning waveforms 105. For example, one ToF measurement apparatus directly measures a 5 nanosecond pulse transit time via an InGaAs avalanche photodiode (APD) focal plane array and readout integrated circuit (ROIC) to generate a 3-D point cloud object space.

The sensing arrangement 102 may be mounted in any convenient location for sensing a target object such as vehicle 108. For example, the sensing arrangement 102 may be mounted on a structure that provides stability and a desirable view of vehicles, such as overpasses, signs, light poles, toll booths, fences, lane dividers, etc. The sensing arrangement 102 may also be suitable for mobile mounting, e.g., on the outside of a motor vehicle. Generally, the sensing arrangement 102 may be placed anywhere outside the target vehicle 108 that provides the desired view and satisfies other installation needs, such as electrical power. The mounting location may also facilitate external data communication, e.g., having cables and/or antennas that can be used to communicate raw or processed data to a data collection facility.

The sensing arrangement 102 is configured for detecting one or more objects in the vehicle 108, including one or more occupants 112. In the illustrated orientation (e.g., facing the front of the vehicle 108), the arrangement 102 can detect occupants 112 by recognizing any combination of facial characteristics, silhouette, torso features, etc. While the sensing arrangement 102 is shown in FIG. 1 as pointed towards a front of the oncoming vehicle 108 (e.g. through windshield 110), the sensing arrangement 102 may configured alternately, e.g., to view the side of a passing vehicle, and/or the back of a retreating vehicle. Multiple sensing arrangements 102 having different views may be used, and their outputs combined to correlate occupant detection data.

The sensing arrangement 102 may have features that are specifically tailored to solve to problem of detecting at least a driver and front seat passenger occupancy in moving or stationary vehicle. For example, the solution may involve generating three-dimensional data (e.g., a depth map or 3D point cloud) for sensing vehicle occupants using the light source 104 and detector 106, which together are configured to operate as a time-of-flight sensor. The detector 106 may include an imaging camera lens and CMOS sensor array structured and driven to detect time of flight of light originating from light source 104 and reflected off of objects in the vehicle 108. The time-of-flight data is used to generate 3D data (e.g., depth map or 3D point cloud) describing the objects. Due to the modulated nature of the light source 104, the light used to determine the time of flight can be discriminated from ambient or background light. Compared to a two-dimensional intensity imaging system, the arrangement 102 is less sensitive than to variations in lighting conditions, shading, obscurations, surface textures and colors, unwanted specular reflections, etc.

A three-dimensional depth map or 3D point cloud produced by the sensing arrangement 102 facilitates relatively simple and robust segmentation and separation between human occupants 112 and other objects in the vehicle 108, such as seats, headrests, visors, background objects, etc. The sensing data may be produced at video frame rates, e.g., 15-60 frames per second, and multiple frames of data may be combined to improve a 3D model used for detecting objects. A time of flight system's performance may ultimately be limited by signal-to-noise rather than by geometry (e.g., triangulation using a reference baseline distance), so the sensing arrangement 102 can be compact. The modulated illumination from light source 104 can be filtered and detected at a signal-to-noise level that is lower than what is needed for two-dimensional intensity imagery. This can reduce the light output power requirements of the light source 104, which lowers cost, and is not distracting to the vehicle occupant 112.

A narrow band light source 104 such as an LED-based illuminator can allow receiving optics to be relatively simple and cheap. Near infrared (NIR) light can also be used, which enables covert or semi-covert illumination. By selecting the appropriate light source (e.g., based on wavelength, optical properties of auto glass, reflectivity of automotive surfaces, etc.), a number of issues that occur using two-dimensional intensity imaging can be overcome using time-of-flight sensing. For example, where the brightness of specular reflections of external objects (clouds, overcast sky, sunlit buildings, etc.) are similar to the brightness of illuminated occupants in vehicle, it can be difficult to detect objects in the vehicle cabin in an intensity image. Likewise, if the brightness of illuminated occupants and background are similar, occupants may be difficult to detect using intensity images, e.g., due to poor contrast in the passenger compartment as seen from outside.

Another issue with two-dimensional intensity images of occupants is that these images can be difficult to segment. Segmentation refers to the process of dividing a digital image into multiple segments. These segments can be used to simplify and/or transform the representation of an image into something that is more meaningful and easier to analyze, e.g., via software. Image segmentation can be used to locate objects and boundaries in images, such as the outline of an occupant in a vehicle. Segmentation of occupants using two-dimensional intensity images can be difficult due to variations in lighting conditions, shading, obscurations, surface textures and colors, unwanted specular reflections, etc.

Figure 2:
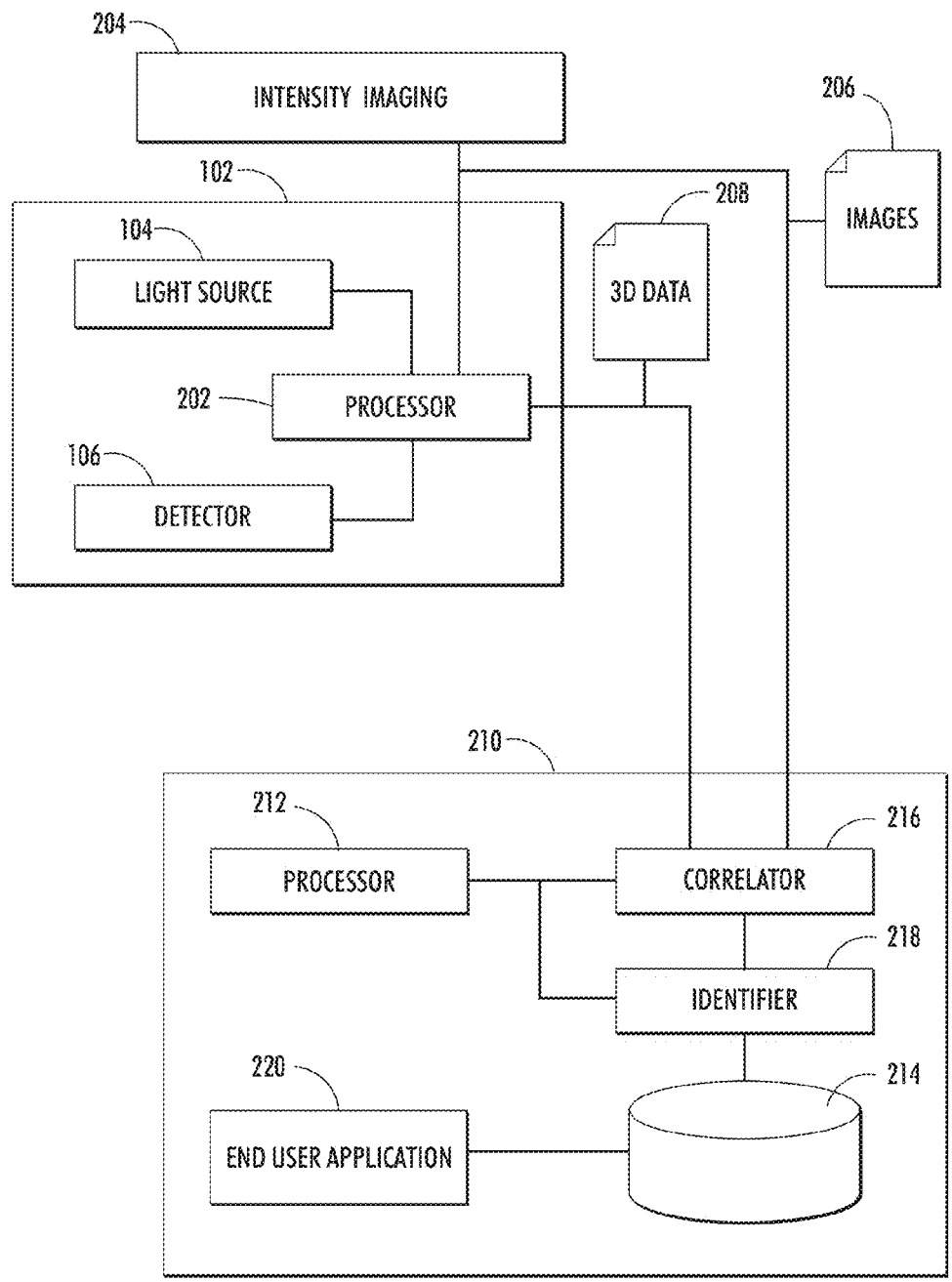
FIG. 2 is a block diagram of a sensing system according to an example embodiment.

In reference now to FIG. 2, a block diagram illustrates a system according to an example embodiment. The system includes a time-of-flight sensing arrangement 102 as previously described. The time-of-flight sensor 102 may be a commercially available ToF camera, such as SR3000/SR4000 from MESA Imaging AG of Zurich, Switzerland, or a CamCube from PMD Technologies GmbH of Siegen, Germany The time-of-flight sensor 102 includes a light source 104 and detector 106 coupled to a processor 202. The processor 202 can trigger and coordinate activities between the light source 104 and detector 106, as well as other hardware. For example, the light source 104 may provide pulse train encoded with data (e.g., a counter) that can be read back by the detector 106 and used to detect time-of-flight differences within a field of view of the detector 106. In other arrangements, the sensor 102 detects a phase shift of reflections from the light source 104, which are converted by the processor 202 to distance measurements, which can then be combined to form 3D data usable to detect objects.

The sensing arrangement 102 may also coordinate other sensors, such as external intensity imaging device 204. Image data 206 from the imaging device 204 may be used to tune the sensing arrangement 102, e.g., determine current conditions that can be used to set parameters for the light source 104 such as wavelength and intensity. Similarly, the imaging device 204 may provide triggers and/or cues that can assist in determining regions for analysis by the sensing arrangement 102. For example, images 206 from the imaging device 204 may be used to determine an approximate location of windows/windshields of vehicles as a point/area of focus for the detector 106. This can prevent processing extraneous data, facilitate optimizing optical parameters, etc.

The output of the imaging arrangement is represented in FIG. 2 as three-dimensional data 208, for example a depth map or 3D point cloud. This data 208 may include a collection of "voxels," or volumetric pixels, used to digitally represent a three-dimensional object. In this example, all voxels in the three-dimensional data 208 may be captured in parallel by the sensing arrangement 102. The parallel acquisition of the three-dimensional data 208 may be useful in occupancy detection scenarios where the vehicle is in motion. This may allow for integration of three-dimensional data over a series of frames to enhance a 3D model used to detect the occupants. The frames may be taken at different times and under slightly different viewing angles, and compositing of the frames can smooth the data and help to reduce the effects of random noise and other types of interference.

The outputs 206, 208 of the sensing arrangement 102 and imager 204 may be communicated to an external facility 210 for further processing and analysis. This facility 210 may include one or more computing arrangements, as represented by processor 212 and database 214. The computing arrangements may be configured with software that analyzes, enhances, categorizes, and otherwise processes two- and three-dimensional image data received from one or more sensing arrangements 102 and supplemental sensing sources such as imagers 204. For example, a correlator 216 may link three-dimensional occupant data 208 with other data, such as license plate and car identity data obtained via imager 204. The correlator 216 may be configured to combine the outputs of multiple sensors 102, 204, e.g., front view, side view, rear view, etc.

The facility 210 may have access to other metadata, such as location, time, etc. This metadata can be added to post-processed data that is stored in the database 214. This is represented by identifier module 218, which may gather metadata from different sources, such as clocks, identifiers added to or extracted from collected data 208, 206, etc. This metadata can be added to correlated data provided from correlator module 216 before the data is added to the database 214. The metadata can be used to categorize, index, and otherwise organize data in the database 214. This can facilitate later discovery and retrieval of data, e.g., via end-user application 220.

The end-user application 220 represents a program targeted for the needs of the end-user of the detection system. Those uses may be related to law enforcement, traffic control, compiling of traffic statistics, crisis management, etc. The applicability of the time-of-flight data to a particular application may depend on a level of detail provided by the sensing arrangement 102. Current commercially available ToF cameras have pixel array sizes ranging from 120×640 to 204×204. In such a case, the time-of-flight sensing arrangement 102 may not have sufficient resolution (based on the current state of the art) to positively identify vehicle occupants from an observation point used to monitor multiple lanes of traffic. This may change as the technology is further refined, however this lack of positive identification may be an advantage in some applications.

For example, HOV (High Occupancy Vehicle) Lane or HOT (High Occupancy Tolling) applications are interested in detecting and counting only the presence of vehicle occupants, not the identity of the individual occupants. Government entities may wish to compile statistics related to vehicle occupancy without raising invasion of privacy concerns. In one scenario, a department of transportation may wish to measure statistics such as average number of occupants per vehicle, compliance with carpool lane rules, etc., but do not wish the gathered information (e.g., traffic camera images) to be used or usable for other purposes (e.g., law enforcement), which could lead to complications and/or violations of the law. In such a case, time-of-flight occupancy data may have sufficient resolution to obtain occupancy counts to acceptable accuracy without the risk that individuals to whom the three-dimensional images pertain can be positively identified.

The systems and apparatuses described herein generally utilize time-of-flight measurements to determine three-dimensional (x, y, z) position of objects. These positions may be expressed in relative to a fixed or moving reference point, e.g., part of the vehicle, camera location, center of mass of measured objects, etc. Generally, an absolute position of detected objects may not be needed so long as features can be discerned based on their relative positions. In reference now to FIG. 3, a diagram illustrates an example of imagery that may be produced by and utilized with a system according to various embodiments.

Figure 3:
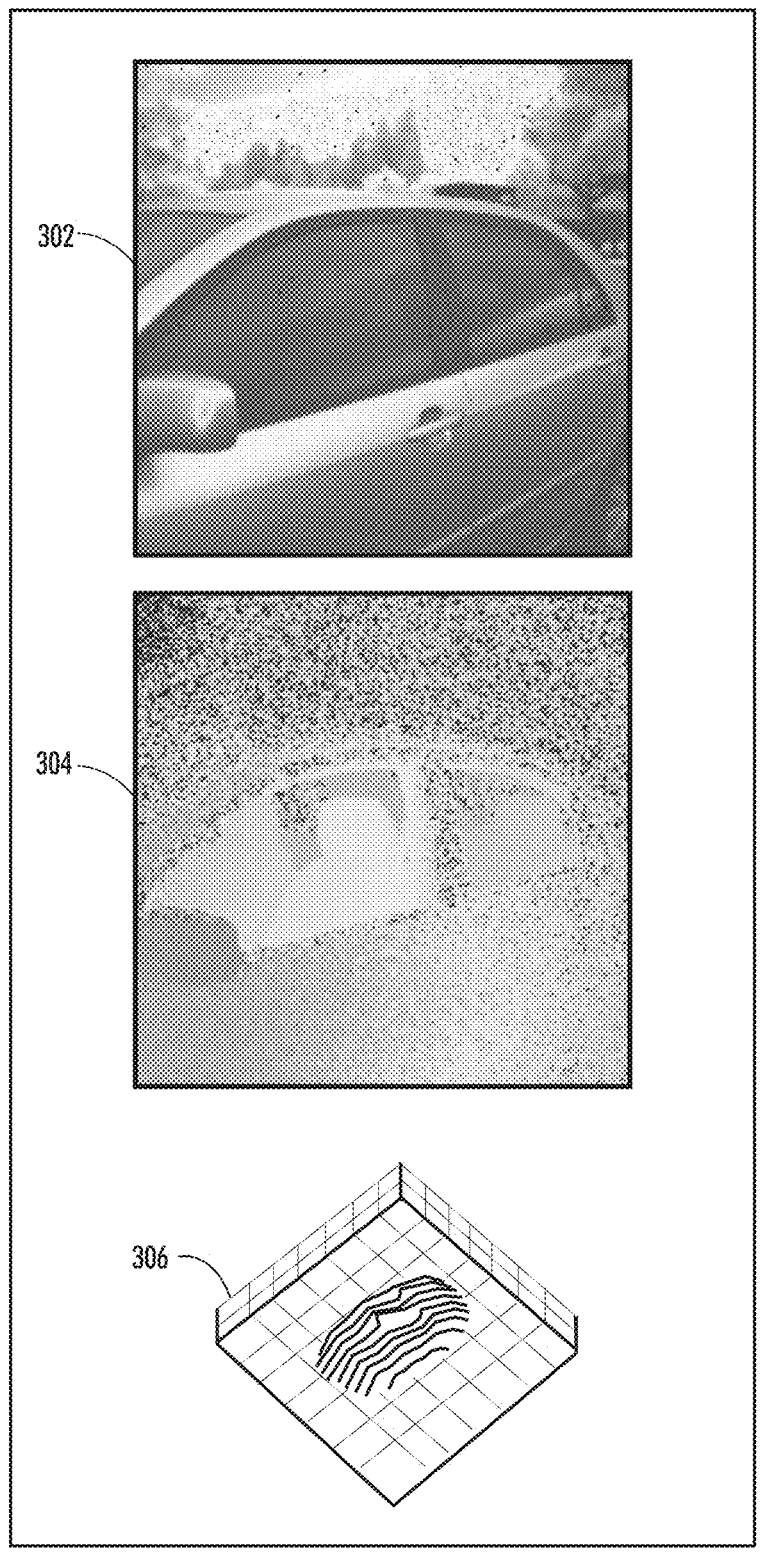
FIG. 3 is a diagram showing examples of imagery produced by systems according to example embodiments.

The examples in FIG. 3 are representative of various types of data captured by the time-of-flight sensor system. Image 302 is a two-dimensional intensity monochrome image. The image 302 can be produced via the time of flight sensor 102 in addition to three-dimensional data and/or can be produced via a supplementary sensor. The image can be used evidentiary photograph for occupancy detection applications if needed.

Image 304 is a range image that is a two-dimensional pixel map where the value (e.g., color, intensity) of each pixel indicates a distance from a reference point. It should be noted that the camera used to obtain this pixel map image 304 was not optimized for this application, and thus exhibits more noise than would be expected for an optimized device. Nonetheless, the interior surfaces (e.g., seats) can be seen in this image 304, even though they are obscured by reflections in image 302.

Image 306 is a depth map which displays data similar to the range image 304. Instead of (or in addition to) using pixel color/intensity values, the image 306 displays the value of each pixel as a coordinate on a three-dimensional coordinate system. Both of these images 304, 306 may contain sufficient data to enable detection of an occupant without revealing identity of the occupant. In any of the example data representations shown in FIG. 3, multiple frames from a ToF video stream can be combined, e.g., to smooth image features, reduce noise, etc.

Figure 4:
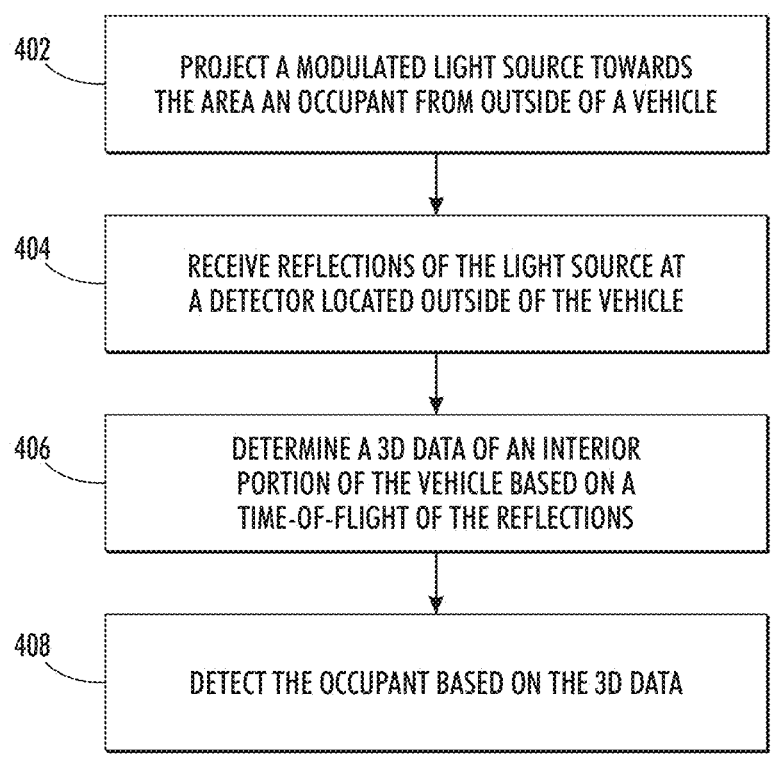
FIG. 4 is a flowchart illustrating procedures according to an example embodiment.

In reference now to FIG. 4, a flowchart illustrates a procedure according to an example embodiment. A modulated light source is projected 402 onto an occupant from outside of a vehicle, e.g., a moving vehicle. Reflections of the source are received 404 at a detector located outside of the vehicle to determine time-of-flight of the reflections. Three-dimensional data is determined 406 based on the time-of-flight of the reflections, and the occupant is detected 408 based on the three-dimensional data. Detecting the occupant may involve recognizing a face and/or an outline of the occupant. Detecting the occupant may involve determining a count of occupants in the vehicle. At least one of the modulated light source and the detector may be part of an apparatus of a traffic monitoring system The various embodiments described above may be implemented using circuitry, firmware, and/or software modules that interact to provide particular results. One of skill in the arts can readily implement such described functionality, either at a modular level or as a whole, using knowledge generally known in the art. The structures and procedures shown above are only a representative example of embodiments that can be used.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
projecting modulated light onto an occupant from a plurality of light sources outside of a vehicle;
receiving reflections of the light sources at a plurality of detectors having different views and located outside of the vehicle, the vehicle moving relative to the light sources and the detectors;
determining three-dimensional data based on a time-of-flight of the reflections; and
detecting the occupant using the three-dimensional data comprising combining the outputs of the plurality of detectors to correlate occupant detection data.

2. The method of claim 1, wherein detecting the occupant comprises recognizing a face of the occupant.

3. The method of claim 1, wherein detecting the occupant comprises recognizing an outline of the occupant.

4. The method of claim 1, wherein detecting the occupant comprises determining a count of occupants in the vehicle.

5. The method of claim 1, wherein at least one of the light sources and the detectors are part of an apparatus of a traffic monitoring system.

6. An apparatus comprising:
a plurality of light sources configured to project modulated light onto an occupant from outside of a vehicle that is moving relative to the light sources;
a plurality of detectors configured to receive reflections of the light, the detectors fixed relative to the light sources and having different views;
a processor coupled to the light sources and the detectors, the processor configured to:
determine time-of-flight of the reflections;
determine three-dimensional data of an interior of the vehicle based on the time-of-flight of the reflections; and
detect the occupant using the three-dimensional data; and
a correlator configured to combine the outputs of the plurality of detectors.

7. The apparatus of claim 6, wherein detecting the occupant comprises recognizing a face of the occupant.

8. The apparatus of claim 6, wherein detecting the occupant comprises recognizing an outline of the occupant.

9. The apparatus of claim 6, wherein detecting the occupant comprises determining a count of occupants in the vehicle.

10. The apparatus of claim 6, further comprising an imaging device configured to set one or more parameters of the light sources.

11. The apparatus of claim 6, wherein the apparatus is part of a traffic monitoring system.

12. A system comprising:
time-of-flight sensors configured to detect objects in an interior of a vehicle from outside of the vehicle that is moving relative to the time-of-flight sensors, the time of flight sensors projecting modulated light onto the vehicle and determining time-of-flight data based on reflections of the light detected by a plurality of detectors having different views; and
a computing arrangement coupled to the time-of-flight sensors, the computing arrangement having a processor configured to:
receive the time-of-flight data from the time-of-flight sensors;
correlate the different views of time-of-flight data;
detect an occupant of the vehicle using the correlated time-of-flight data; and
signal the detection of the occupant to an end-user application.

13. The system of claim 12, wherein detecting the occupant comprises recognizing a face of the occupant.

14. The system of claim 12, wherein detecting the occupant comprises recognizing an outline of the occupant.

15. The system of claim 12, wherein detecting the occupant comprises determining a count of occupants in the vehicle.

16. The system of claim 12, wherein the user application comprises a traffic monitoring system.

17. The system of claim 12, where the data received from the time-of-flight sensors comprises a sequence of frames each having three-dimensional data.

18. The system of claim 17, wherein detecting the occupant comprises combining two or more of the frames to form an improved three-dimensional model based on the three-dimensional data.

19. The method of claim 1, further comprising:
determining a location of a window of the vehicle using an intensity imaging device.

* * * * *